United States Patent [19]

Goodman

[11] 4,141,533

[45] Feb. 27, 1979

[54] HYDRAULICALLY OPERATED SHUTOFF VALVE

[75] Inventor: Robert B. Goodman, West Hartford, Conn.

[73] Assignee: United Technologies Corporation, Hartford, Conn.

[21] Appl. No.: 748,841

[22] Filed: Dec. 9, 1976

[51] Int. Cl.² ............................................ F16K 31/124
[52] U.S. Cl. ........................................ 251/58; 60/413; 251/280
[58] Field of Search ................... 60/413, 418; 251/58, 251/279, 280, 327; 91/4 R

[56] References Cited

U.S. PATENT DOCUMENTS

| | | | |
|---|---|---|---|
| 760,595 | 5/1904 | Wiesebrock | 251/280 |
| 2,392,471 | 1/1946 | Fox | 60/418 |
| 2,674,092 | 4/1954 | Gardiner | 60/418 |
| 2,708,344 | 5/1955 | Greer | 60/418 |
| 2,741,478 | 4/1956 | Mercier | 60/418 |
| 2,954,960 | 10/1960 | Dunbar et al. | 251/327 |
| 3,225,544 | 12/1965 | Lemley | 60/418 |
| 3,329,403 | 7/1967 | Juds | 91/4 R |
| 3,436,913 | 4/1969 | Muller et al. | 60/418 |
| 3,593,824 | 7/1971 | Gregory | 60/413 |
| 3,730,214 | 5/1973 | Brumm | 251/58 |

*Primary Examiner*—Martin P. Schwadron
*Assistant Examiner*—G. L. Walton
*Attorney, Agent, or Firm*—Charles A. Warren

[57] ABSTRACT

A fast closing shutoff valve having a self-contained hydraulic actuating system and an emergency pneumatic back-up system. The hydraulic system includes an accumulator for a high closing rate with a minimum size pump. The actuating system operates through a toggle linkage to reduce valve rate as valve nears closed position to reduce impact loads and increase closing pressure.

9 Claims, 1 Drawing Figure

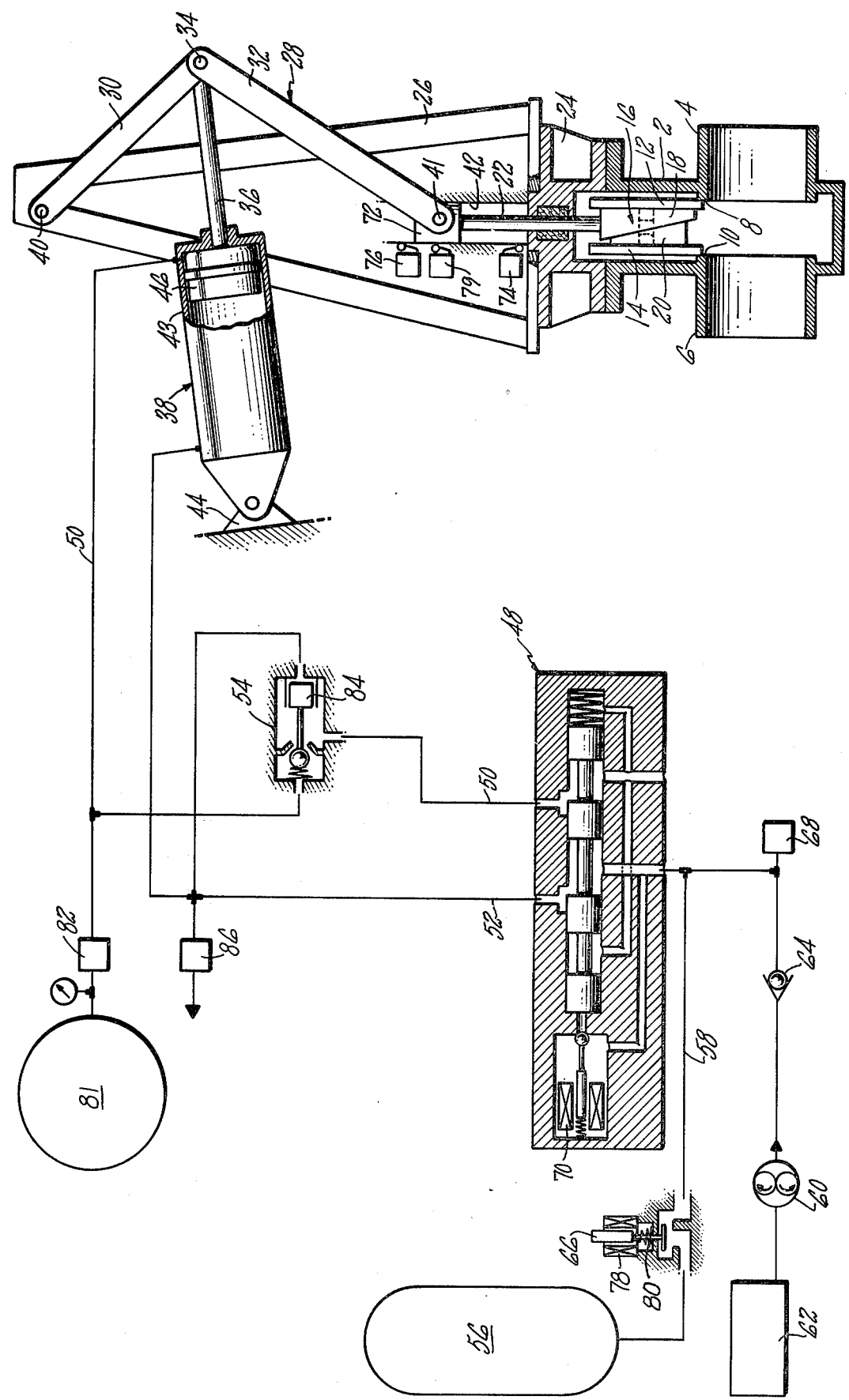

HYDRAULICALLY OPERATED SHUTOFF VALVE

BACKGROUND OF THE INVENTION

Certain valve installations require a dependable, rapid operation as well as an emergency actuation should the main actuating system fail, together with systems for checking the operability of the system as needed. Actuation of these valves necessitates a large amount of actuating fluid and this has been provided by a large capacity pump, increasing the size and cost of the installation.

SUMMARY OF THE INVENTION

One feature of the invention is a self-contained hydraulic system incorporating an accumulator so that the pump size may be kept small. Another feature is an emergency back-up system in the event of the main system failure. Another feature is isolation of the accumulator as the valve nears closed position to use full pump pressure in the actuating motor. One feature is a toggle linkage in the valve actuation mechanism to reduce the necessary activating pressure and to reduce the valve velocity as its approaches closed position to reduce impact loads and increase applicable closing pressure.

According to the invention the valve, which is a wedge-seated valve, is moved by a hydraulic motor operating through a toggle linkage that approaches center as the valve reaches closed position. The hydraulic motor is a part of a self-contained hydraulic system that includes an accumulator that permits rapid motion of the valve. An emergency pneumatic system is incorporated in the event of hydraulic system failure. The system incorporates devices to permit checking the operability of the entire system.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The single FIGURE shows the system diagrammatically and the valve and actuator in section.

DESCRIPTION OF THE PREFERRED EMBODIMENT

The valve was particularly developed for use on a large diameter conduit for cutting off the flow of fluid therethrough. The valve has a housing 2 having aligned duct passages 4 and 6. The inner ends of these passages are spaced apart to form spaced valve seats 8 and 10 to be engaged by valve discs 12 and 14 on the movable valve element 16. This is a wedge-seated valve element and as shown the plates 12 and 14 are on cooperating wedges 18 and 20. As the valve element 16 is moved from the open position shown to the closed position in line with the ducts 4 and 6 the valve discs are in contact with the seats 8 and 10. A further slight axial movement of the actuating rod 22 to which the valve element 16 is attached causes the wedges to interact moving the disc apart and into secure leak-tight engagement wtih the valve seats.

The valve housing 2 supports a spacer member 24 surrounding the rod 22 and the member 24 in turn carries a frame 26 on which a toggle linkage 28 is mounted. This linkage is made up of links 30 and 32 connected together at one end as by a pin 34 that also connects to the actuating rod 36 of the hydraulic motor 38. The other end of link 30 is pivoted at 40 to the top of the frame 26 and the remote end of link 32 is pivoted at 41 to the valve rod 22. The latter is supported in guides 42, shown schematically to absorb the transverse forces on the linkage. This toggle is so positioned that the links are nearly straight and the toggle thus approaches center as the valve reaches closed position thus slowing the valve motion and decreasing the force needed to move the valve. Such slower motion may also reduce possible water-hammer in the valve and associated piping.

The hydraulic actuator includes a cylinder 43 pivotally supported at one end on a fixed bracket 44, shown diagrammatically, and having a piston 46 carrying the rod 36. Movement of the piston to the left moves the valve toward closed position and movement to the right opens the valve through the function of the toggle, the latter providing an amplification of the actuator force to move the valve, especially near the closed position.

The hydraulic actuator is controlled by a self-contained hydraulic system. Fluid is directed to opposite ends of the actuator cylinder 43 by a main control valve 48 through conduits 50 and 52. In conduit 50 is an emergency drain and shutoff valve 54 the function of which will be described later. The main valve receives fluid from an accumulator 56 through a conduit 58, the latter being also connected to a pump 60 which draws fluid from a reservoir 62. A check valve 64 is also in this conduit.

With the main valve in the position shown, fluid is directed to the actuator to hold the valve element 16 in open position. At this time the drain valve 54 is open to connect the right end of the actuating cylinder to drain. An isolation valve 66 in the conduit from the accumulator to the pump allows the accumulator to be charged to the desired pressure, in this case 2000 psi. A pressure switch 68 shuts off the pump at full pressure, e.g., 2250 psi and starts the pump at starting pressure, e.g., 2000 psi.

When the valve is to be closed, the main control valve solenoid 70 is energized, manually or otherwise, shifting the valve to supply pressure to the closing side of the actuator and connecting the opening side (the left) to drain. The shutoff valve 54 is held open at this time by the flow through it. As the valve 16 closes the pressure in the accumulator drops significantly, and in closing position the head 72 on the valve rod 22 engages and closes a limit switch 74. This switch is electrically connected to the solenoid 78 for the valve 66 and when closed energizes the solenoid 78 and closes the isolation valve 66. This serves to isolate the accumulator and direct full pump flow and pressure to the actuator for wedging the valve closed.

To open valve 16 the main control valve solenoid is deenergized, the main valve is shifted to the position shown and fluid from the pump to the actuator starts the valve opening. As the valve 16 moves slightly from closed position the limit switch is opened, causing isolation valve to open and direct fluid from the accumulator to the actuator for the completion of valve opening movement. When the valve is fully open the head 72 engages and closes a limit switch 76 that provides a signal to a remote control station that the valve is in fully open position.

In order to check for proper valve functioning while there is flow through the valve and without causing a significant pressure drop in the piping system, a Test Close 10% function is employed. When a "test" circuit including the solenoid 70 and the solenoid 78 for the isolation valve 66 is activated, both these solenoids are energized and the main valve starts to close as described previously. Because the closing is occurring only under the flow from the pump, the valve 66 being closed, this test closing will be at a slower than normal rate. After reaching the 10% close position a limit switch 79 is tripped causing the solenoid 78 and the main control valve solenoid 70 to both of which it is electrically connected as above stated to be deenergized. Simultaneously, a signal will be sent to a control panel indicating the valve to be 10% closed. With the solenoids 70 and 78 deenergized, a spring 80 at the solenoid 78 for the isolation valve 66 shifts this control valve spool to the normal open position shown, allowing hydraulic pressure from the accummulator 56 to reach the opening side of the actuator 38 causing the valve to return to the full open position.

An emergency pneumatic closing system may be used in the event of hydraulic failure or other emergency. This system includes an air tank 81 connected through a squib valve 82 to the conduit 50 and thence to the "close" end of the actuator 38. The emergency drain valve 54 has its pressure element 84 connected to conduit 52 and thence through a squib valve 86 to drain. By opening both squib valves by an electrical signal that may be manually controlled, the tank 81 is connected to the actuator 38, the valve 54 is closed since the pressure element 84 is connected to drain through valve 86 opened simultaneously with valve 82 thereby to prevent loss of fluid through conduit 50 to and through the main valve and the "close" end of the actuator is connected through valve 86 to drain.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. An actuating system for a hydraulically actuated valve requiring high pressure actuation to seal the valve when closed including:

a wedge actuated valve, a hydraulic actuator for moving said valve between open and closed positions, an accumulator for storing fluid under pressure for use in the hydraulic actuator, pump means to pressurize the accumulator, and means responsive to movement of the valve and operative when the valve reaches closed position to isolate the accumulator from said pump means and said actuator and apply full pump pressure directly and fully to the actuator.

2. As actuating system as in claim 1 in which a toggle device is connected to the valve for moving it, and also connected to and moved by the actuator.

3. An actuating system as in claim 2 in which the toggle approaches center as the valve reaches closed position.

4. An actuating system as in claim 1 including an emergency system for supplying actuating fluid to the actuator independently of the accumulator and pump.

5. An actuating system for high speed closing of a hydraulically actuated valve including:

a main valve, a hydraulic actuator for moving said valve between open and closed positions, an accumulator for supplying fluid to said actuator, a pump for pressurizing the accumulator, toggle means between the actuator and the valve for increasing the applicable force from the actuator on the valve; and means responsive to valve movement into closed position for isolating the accumulator from said pump and said actuator and supplying fluid directly from the pump to the actuator.

6. An actuating system as in claim 5 including a switch actuated by valve movement into closed position for actuating said isolating means.

7. An actuating system as in claim 5 in which the toggle is mounted so as to approach center as the main valve reaches closed position.

8. An actuating syste as in claim 5 including an emergency valve closing independent of the accumulator and pump for separately supplying fluid to the actuator.

9. An actuating system as in claim 5 in which the main valve is wedge actuated and the toggle increases the valve closing pressure from the actuator.

* * * * *